United States Patent Office 3,191,504
Patented June 29, 1965

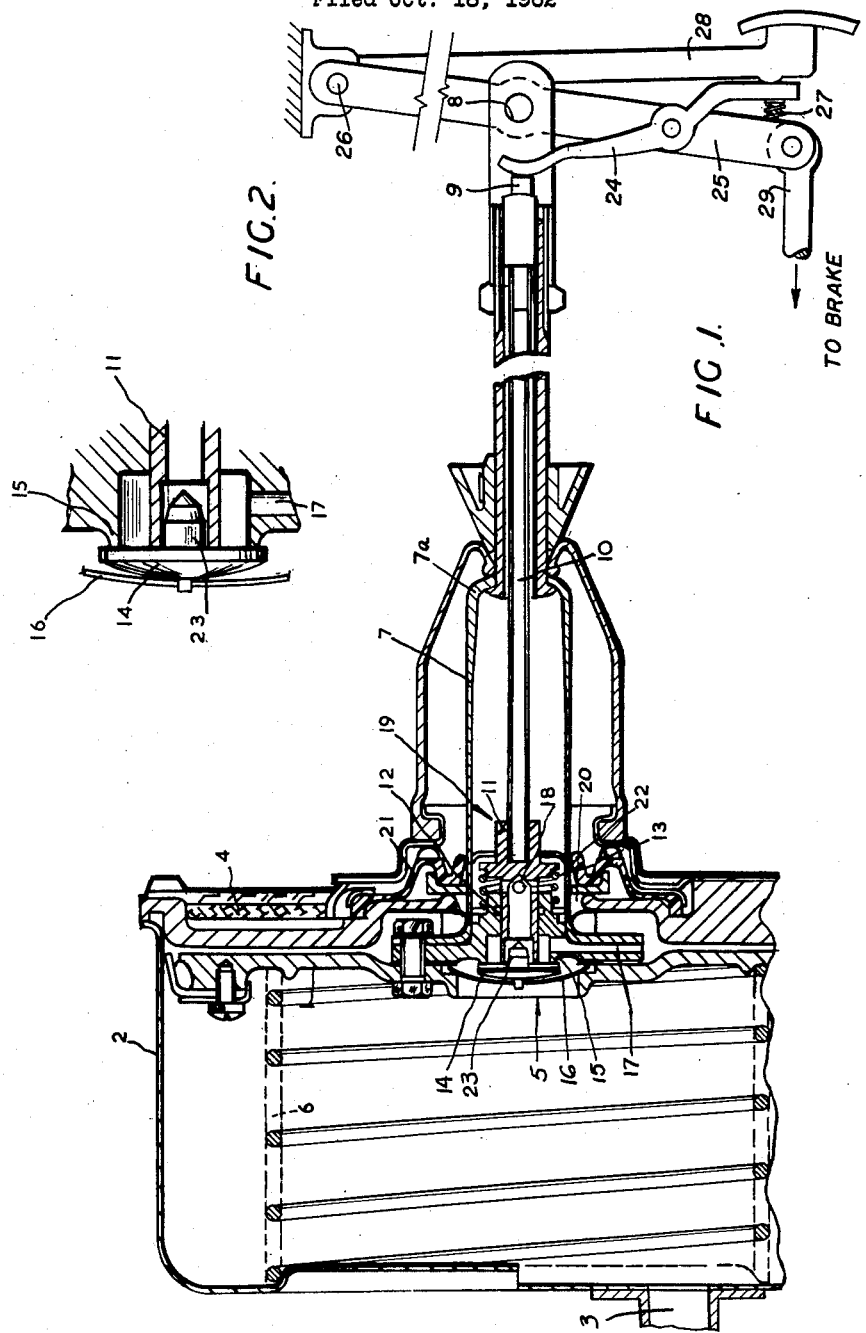

3,191,504
BOOSTER FOR BOOSTER-ASSISTED ACTUATING SYSTEMS
Desmond Henry James Reynolds, Sutton Coldfield, England, assignor to Girling Limited, Birmingham, England, a British company
Filed Oct. 18, 1962, Ser. No. 231,359
Claims priority, application Great Britain, Oct. 18, 1961, 37,313/61
11 Claims. (Cl. 91—377)

This invention relates to boosters operated by a pressure differential and used to augment an input force. Such boosters are used, for example, in braking systems for vehicles, and the pressure medium is usually air, the differential being either that between atmospheric pressure and a source of vacuum, or that between a source of compressed air and atmospheric pressure.

The operation of the booster is controlled by valves under the control of the input force and difficulty is experienced in obtaining smooth operation of the booster in practice, because the sudden rush of the pressure medium when the valve controlling it is opened tends to produce a sudden movement of the booster piston or diaphragm, leading thereby to sudden closing or partial closing of the valve, and the overall result is a juddering or "stop-go" motion of the booster. It is an aim of the invention to overcome this problem and to provide a booster with a valve arrangement which helps to produce smooth and progressive movement of the booster piston or diaphragm.

According to the invention there is now proposed a pressure-differential-operated booster having a piston or diaphragm across which a pressure differential is developed by the admission or withdrawal of a pressure medium through a valve, the resultant flow of pressure medium being such as to cause movement of the piston or diaphragm that will result in closing of the valve, in which the valve is formed by an annular seating engaged by a valve head carrying a projection which limits the effective area of the valve orifice on initial opening of the valve but progressively reduces that limitation as the valve opens further, giving substantially unrestricted passage of the pressure medium when the valve is fully open.

The valve may for example take the form of a valve head with a flat face engaged by a tubular seating, in which case the desired result is achieved by providing a projection or obturator extending from the face of the valve head into the seating and shaped to give a progressive change of the effective area of the opening as the head and seating move apart. The obturator can be designed to have a shape that will give any desired relationship between movement and effective area.

The invention will now be described by way of example with reference to the accompanying drawings, in which:

FIGURE 1 is an axial section through a booster embodying the invention; and

FIGURE 2 is a view to a larger scale of the air valve of the booster.

The booster illustrated uses air as the pressure medium and is of a kind operated by the difference between atmospheric pressure and the pressure of a source of vacuum. It is of the "vacuum-suspended" type, that is to say, the type in which, when the booster is at rest, both sides of its piston or diaphragm are exposed to the pressure of the source of vacuum.

A piston 1 is slidable in a cylinder 2 of which the left-hand end is permanently connected at 3 to a source of vacuum (not shown). Atmospheric air can enter through a filter 4 to the right-hand end of the cylinder under the control of a valve assembly 5, to be described in detail later, mounted in the piston and this admission of air moves the piston 1 to the left against the action of a compression spring 6. The piston is connected to a piston rod 7, the free end of which has an eye 8 for attachment to the member that is to be moved. The controlling force is applied to a button 9 which is near the eye 8 and is on the end of a push-rod 10 sliding coaxially within the piston rod 7.

The other end of the push rod 10 engages a sleeve 11 which is axially slidable in a seal 12 in the piston 1 against the action of a helical coil compression spring 13. The free end of the sleeve 11 forms a valve seating engaged by the flat face of a disc-like valve head 14. The same face of this valve head 14 is also engaged by a second seating 15 which is formed in the piston itself and is concentric with, but outside, the seating formed by the sleeve 11. A bowed leaf spring 16 in the shape of a narrow strip urges the valve head 14 onto the seating 15.

The annular space between the two concentric seatings is in communication, through a radial passage 17, with that part of the cylinder 2 which lies to the right of the piston 1. The co-operation of the valve head 14 with the seating 15 thus forms what we will call the "vacuum valve," i.e. the valve controlling communication between the two ends of the cylinder 2. The right-hand end of the sleeve 11, i.e. that end which is clear of the seal 12, has radial holes 18 in it putting the interior of the sleeve in communication with a space 19 which is at atmospheric pressure, being in communication with the atmosphere through the filter 4 mentioned earlier. Thus the co-operation of the valve head 14 with the sleeve 11 forms what we will call the "air valve," controlling the admission of air to the right hand end of the cylinder 2.

Where the piston rod 7 passes through the right hand end of the cylinder 2 there is substantial clearance, as indicated by the gap shown at 20. This means that the piston rod and the piston are free of lateral restraint at this point and they can be allowed to articulate with respect to the cylinder, that is to say, the eye 8 can be connected to a member that does not necessarily move in a straight line, for example to the end of a lever moving in an arcuate path, and yet there is no need for the cylinder 2 to be flexible mounted. A diaphragm 21 of flexible material such as rubber, with its outer periphery secured to the end wall of the cylinder 2 and its inner edge shaped into a lip 22 around the piston 7 forms an airtight seal without imposing restraint on the piston rod.

The means for biasing the member 9 to the left in FIG. 1 may comprise one end of a lever 24 centrally pivoted to a link 25 having a fixed pivot 26 at one end as shown. A spring 27 at the lower end of the link 25 operates against the opposite end of the lever 24 to urge it counter-clockwise against the inner side of a pedal member 28 whose upper end is also pivoted to the fixed pivot 26. The lower end of the link 25 is connected to a brake actuating rod 29 which serves to apply the brakes when the link 25 is moved clockwise either directly by the pedal or by the booster depending upon the circumstances. It will be apparent that when the pedal is moved to the left the spring 27 is compressed and the lever 24 is moved clockwise away from the member 9 to initiate operation of the booster.

The booster is shown with its valves in an intermediate position. In the normal rest position of the booster the push rod 10 holds the sleeve 11 further to the left than it is shown in the drawings, thus lifting the valve head 14 off the seating 15 and putting the right hand end of the cylinder 2 in communication with the left hand end through the passage 17 and past the valve head 14 and therefore with the source of vacuum. To bring the booster into action the force on the button 9 holding the push-rod 10 to the left is reduced or removed. This allows the sleeve 11 to move to the right; first of all the head 14 engages the seating 15, cutting off communication between the two ends of the cylinder 2, and then the sleeve 11 moves away from the head 14, allowing atmospheric air to pass from the filter 4 via a passage 7a in the wall of piston rod 7 and thence through holes 18 and the bore of sleeve 11 through the passage 17 to the right hand end of the cylinder. The piston 1 is urged to the left, carrying with it a member such as the link 25 which is connected to the eye 8 on the piston rod 7.

Movement of the piston 1 to the left carries with it the member that is attached to the eye 8. As will readily be understood by those skilled in the art, this will result in subsequent displacement of the controlling force such as to move button 9 to the left with respect to eye 8, causing a reversal of the changes referred to above, i.e. first causing sleeve 11 to engage valve head 14, cutting off the right-hand end of cylinder 2 from the atmosphere and then pushing valve head 14 off seating 15 against the force of leaf spring 16 to put the righthand end of cylinder 2 in communication once again with the source of vacuum. The behavior of the booster in response to an input force is the same as an orthodox booster and is believed to be well understood by those skilled in the art.

The pressure difference between atmospheric and the source of vacuum is always acting on the face of the valve head 14 within the diameter of the sleeve 11 and the strength of spring 16 is sufficient to counteract this. However, with an arrangement as described so far, when the sleeve 11 starts to move away from the head 14 the sudden rush of atmospheric air can act on a greater area of the head 14, causing an increase in the force tending to urge the valve head and the sleeve apart. This is a cumulative action, in that the increased force causes increased separation between the valve head and the sleeve, accentuating the rush of air. Consequently the movement of the piston 1 is liable to be jerky, and juddering results.

This is overcome according to the present invention by the provision of a boss or projection 23 on the face of the valve head 14, obtruding into the mouth of the sleeve 11 to restrict the flow of air on initial opening of the air valve. In the example shown the boss has a cylindrical base surmounted by a frusto-conical portion of fairly acute apex angle and terminating in a conical point of more obtuse angle. However, it will be understood that the boss can be formed to any shape that will give the desired continuously progressive relationship between movement of the sleeve and pressure drop to give a smooth and judder-free opening of the air valve. For example the projection could be of plain conical shape. On initial opening of the valve the annular space between the boss 23 and the inner wall of the sleeve 11 is small and consequently there is a substantial pressure drop across the valve. However when the sleeve 11 is moved well to the right to open the valve fully the boss 23 is clear of the sleeve 11 and the flow of air is unrestricted. We therefore obtain rapid and large volumes of air flow, giving the booster a rapid response to the controlling force, yet the control that the boss 19 gives to the initial part of the valve-opening movement ensures smooth and progressive operation.

The invention has been described with reference to a vacuum-suspended vacuum booster but it will be understood that it could be applied also to an atmosphere suspended vacuum booster (in which operation of the booster is achieved by withdrawing air from one side of the piston through the valve) or to a booster in which the pressure medium is above atmospheric pressure. Likewise, although we have referred to a piston it could equally well be replaced by a diaphragm.

I claim:

1. In a pressure-differential-operated booster comprising a cylinder in which a wall is movable in response to a fluid pressure difference, said movable wall being connected to an operating rod, a valve controlling the flow of a fluid pressure medium with respect to an end of said cylinder to cause said pressure difference, said valve being opened by a control member and being allowed to close by movement of said wall relative to said control member consequent on said pressure difference, and said valve comprising a valve head, a valve seating engageable by said head, and obturating means, said obturating means being secured to said head and extending into said seating in the closed position of said valve, and said obturating means being partially of cylindrical shape and said seating being likewise of cylindrical shape to restrict the flow of pressure medium through said valve on initial opening thereof, the degree of restriction being progressively reduced on movement of said valve in the opening direction, whereby in the fully open position of said valve said obturating means are substantially clear of said seating.

2. In a pressure-differential-operated booster valve means as set forth in claim 1 wherein said valve head as a flat face and said obturating means comprise a projection on said face, extending into said seating in the closed position of said valve.

3. In a pressure-differential-operated booster, valve means as set forth in claim 2, wherein said projection is at least partially of conical shape, with its larger end adjacent the face of said valve head.

4. A pressure-differential-operated booster comprising a cylinder, a wall movable in said cylinder in response to a difference in fluid pressure between the ends of said cylinder, a piston rod connected to said wall, a valve head having a flat face, a first seating engageable by said face, a fluid connection to said first seating, a fluid connection between the side of said head remote from said face and a region of said cylinder on one side of said wall, a second seating engageable by said face, said second seating being concentric with said first seating to define therebetween an annular space, a fluid connection between said space and the region of said cylinder on the other side of said wall, a valve control member, said control member acting on said first seating to urge said first seating against said valve head thereby urging said valve head away from said second seating in the rest position of the booster, and obturating means, said obturating means being secured to said face and extending into said first seating in the closed position of said valve head and being shaped to restrict the flow of pressure fluid between said face and said first seating on initial movement of said first seating away from said face, the degree of restriction being progressively reduced on movement of said first seating away from said face, whereby in the maximum open position of said first seating said obturating means are substantially clear of said first seating.

5. A pressure-differential-operated booster as set forth in claim 4, wherein said obturating means is at least partially of conical shape, with its larger end adjacent said face.

6. A pressure-differential-operated booster as set forth in claim 4, wherein said valve head is disposed in and moves with said movable wall.

7. A pressure-differential-operated booster as set forth in claim 4, wherein said valve control member comprises a rod coaxial with said piston rod.

8. A pressure-differential-operated booster as set forth in claim 4, wherein said piston rod is free to move angularly with respect to said cylinder, and including a flexible membrane forming a fluid-tight seal between said piston rod and an end of said cylinder.

9. In a pressure-differential-operated booster, valve means as set forth in claim 3 wherein said obturating means comprises a cylindrical portion adjacent said valve head and a conical portion adjacent said cylindrical portion.

10. A pressure-differential-operated booster as set forth in claim 4 wherein said obturating means comprises a cylindrical portion adjacent said face and a conical portion adjacent said cylindrical portion with its base engaging said cylindrical portion.

11. In a pressure-differential-operated booster comprising a cylinder in which a wall is movable in response to a fluid pressure difference, said movable wall being connected to an operating rod, a valve controlling the flow of a fluid pressure medium with respect to an end of said cylinder to cause said pressure difference, said valve being opened by a control member and being allowed to close by movement of said wall relative to said control member consequent on said pressure difference, said valve comprising a valve head, a valve seating engageable by said head, and obturating means secured to said head and extending freely into said seating in the closed position of said valve, said obturating means having less cross-sectional area than said seating and being free of any contact therewith when in closed position and being adapted to restrict the flow of pressure medium through said valve on initial opening thereof, the degree of restriction being progressively reduced on movement of said valve in the opening direction, whereby in the fully open position of said valve said obturating means are substantially clear of said seating.

References Cited by the Examiner
UNITED STATES PATENTS

| | | |
|---|---|---|
| 1,479,386 | 6/24 | Hynes et al. |
| 2,745,383 | 5/56 | Hupp. |
| 2,799,252 | 7/57 | Ingres. |
| 2,829,625 | 4/58 | Hupp et al. _____ 91—377 |
| 2,927,608 | 3/60 | Jenkins et al. |
| 2,990,917 | 7/61 | Stelzer. |
| 3,054,386 | 9/62 | Bohnhoff. |

SAMUEL LEVINE, *Primary Examiner.*

KARL J. ALBRECHT, FRED E. ENGELTHALER,
*Examiners.*